United States Patent
Asoh et al.

(10) Patent No.: US 7,664,084 B2
(45) Date of Patent: Feb. 16, 2010

(54) TECHNIQUES FOR SELECTING AN ACCESS POINT APPARATUS BASED ON AN ALLOWANCE AREA

(75) Inventors: Junichi Asoh, Machida (JP); Kazuo Fujii, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 728 days.

(21) Appl. No.: 11/301,186

(22) Filed: Dec. 12, 2005

(65) Prior Publication Data

US 2006/0153138 A1    Jul. 13, 2006

(30) Foreign Application Priority Data

Dec. 13, 2004    (JP)    ............................. 2004-360629

(51) Int. Cl.
*H04W 4/00*    (2009.01)
(52) U.S. Cl. ........................ 370/338; 370/332; 370/333; 455/447; 455/509
(58) Field of Classification Search ................. 370/338, 370/332, 333; 455/447, 509
See application file for complete search history.

(56) References Cited

U.S. PATENT DOCUMENTS

| | | | |
|---|---|---|---|
| 6,208,629 B1 * | 3/2001 | Jaszewski et al. | 370/329 |
| 2004/0102192 A1 * | 5/2004 | Serceki | 455/434 |
| 2004/0127162 A1 * | 7/2004 | Maki et al. | 455/67.11 |
| 2004/0137908 A1 * | 7/2004 | Sinivaara et al. | 455/452.1 |

\* cited by examiner

*Primary Examiner*—Barry W Taylor
(74) *Attorney, Agent, or Firm*—Anthony P. Ng; Dillon & Yudell LLP

(57) ABSTRACT

A wireless station that includes an access point apparatus detection section which detects a usable access point apparatus from among a plurality of access point apparatuses; an allowance area calculation section which calculates an allowance area according to received signal strength indicator, frequency, and frequency bandwidth of a radio wave transmitted by a rogue access point apparatus whose frequency bandwidth overlaps with that of the usable access point apparatus, as well as according to received signal strength indicator, frequency, and frequency bandwidth of a radio wave transmitted by the usable access point apparatus; and an access point apparatus selection section which selects one access point apparatus based on the allowance area.

20 Claims, 5 Drawing Sheets

TECHNIQUES FOR SELECTING AN ACCESS POINT APPARATUS BASED ON AN ALLOWANCE AREA

PRIORITY CLAIM

This application claims priority of Japanese Patent Application No. 2004-360629, filed on Dec. 13, 2004, and entitled, "Wireless Station."

BACKGROUND OF THE INVENTION

1. Technical Field

The present invention relates to a wireless station and a method for selecting an access point apparatus using the wireless station, and more particularly to a method for selecting, by a wireless station within a wireless LAN (Local Area Network), an access point apparatus, and a wireless station which implements this method.

2. Description of the Related Art

It has hitherto been known that in selecting an optimum access point from among a plurality of access point apparatuses, a wireless station in a wireless LAN system selects an access point apparatus generating a highest signal strength by use of received signal strength indicator of a radio wave generated by an access point apparatus.

However, even when an access point apparatus having a highest received signal strength indicator is selected, since interferences occur between the plurality of access point apparatuses, an optimum access point apparatus is not always selected. Specifically, because a radio wave generated by an access point apparatus has a predetermined frequency bandwidth, when the center frequencies of radio waves generated by the plurality of access point apparatuses are close to each other, the frequency bandwidths overlaps. Consequently, interferences occur.

It is known that when such interferences between a plurality of access point apparatuses are detected by a computer (a radio station), the presence of the interferences (the presence of channel occupancy by a noise) is displayed in a display section of the computer (Patent Document 1—Japanese Published Unexamined Patent Application No. 10-093616).

According to Patent Document 1, when it is determined that channel occupancy by a noise has been in progress for a predetermined time period, a display is given in the display section of the computer to notify an administrator that the channel occupancy is caused by a noise.

However, the invention of Patent Document 1 is limited to displaying of interference detection by a radio station and notifying it to an administrator. Consequently, an optimum access point apparatus cannot be selected. Specifically, the wireless station only evaluates the extent of interference with respect to a firstly-connected access point apparatus, and cannot carry out an evaluation to identify an optimum access point apparatus for the wireless station.

SUMMARY OF THE INVENTION

It is desirable from a viewpoint of communication stability after connection that, in first selecting an access point apparatus, a wireless station can select an optimum access point suffering little interference and having a high received signal strength indicator.

Accordingly, one object of the present invention is to provide a method for selecting, by a wireless station, an optimum wireless station or access point apparatus suffering the least interference influence and having a high received signal strength indicator in selecting one from among plural access point apparatuses.

A wireless station is provided for use in a wireless LAN (Local Area Network) system, performing data communication with a server via a plurality of access point apparatuses, the wireless station comprising: an access point apparatus detection section which detects a usable access point apparatus from among the plurality of access point apparatuses; an allowance area calculation section which calculates an allowance area according to received signal strength indicator, frequency, and frequency bandwidth of a radio wave transmitted by an access point apparatus (a rogue access point apparatus) whose frequency bandwidth overlaps with that of the usable access point apparatus, as well as according to received signal strength indicator, frequency, and frequency bandwidth of a radio wave transmitted by the usable access point apparatus; and an access point apparatus selection section which selects one from among the plurality of access point apparatuses based on the allowance area.

The access point apparatus detection section of a wireless station detects a usable access point apparatus from among a plurality of access point apparatuses; the allowance area calculation section of the wireless station calculates an allowance area according to received signal strength indicator, frequency, and frequency bandwidth of a radio wave transmitted by an access point apparatus (a rogue access point apparatus) whose frequency bandwidth overlaps with that of the detected usable access point apparatus, as well as according to received signal strength indicator, frequency, and frequency bandwidth of a radio wave transmitted by the usable access point apparatus; and the access point apparatus selection section of the wireless station selects one from among the plurality of access point apparatuses based on the allowance area.

Accordingly, the wireless station calculates an allowance area of the plurality of usable access point apparatuses according to received signal strength indicator, frequency, and frequency bandwidth of each said access point apparatus, as well as by use of received signal strength indicator, frequency, and frequency bandwidth of a rogue access point apparatus causing interferences to occur, and selects based on the allowance area, an access point apparatus. Thus it is possible to provide an optimum wireless station suffering the least interference influence and having a high received signal strength indicator.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
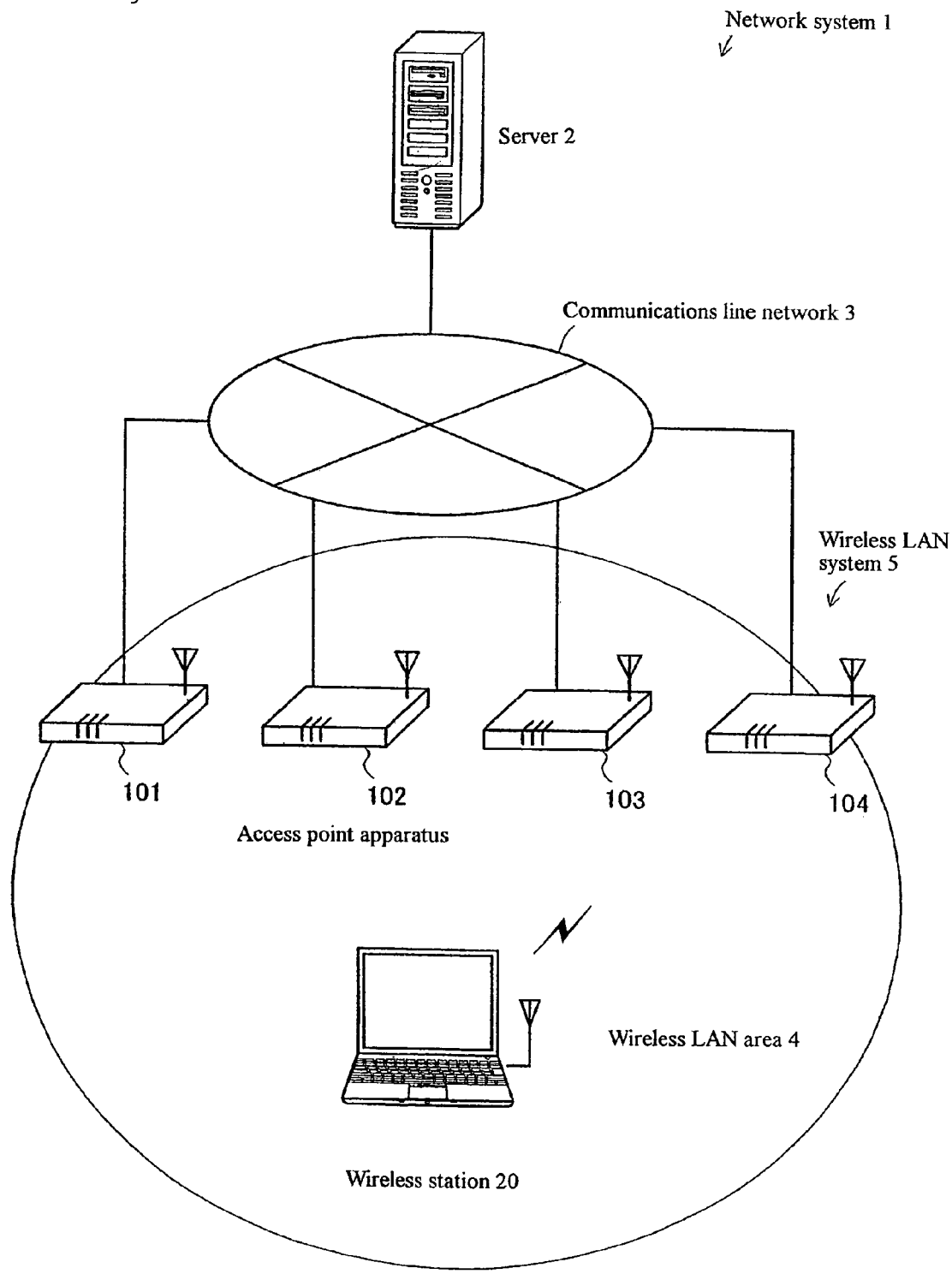
FIG. 1 depicts a network system in which the present invention may be implemented.

With reference now to the figures, and in particular to FIG. 1, there is depicted an embodiment to which the present invention may be applied. The network system 1 comprises a server 2, a communications line network 3 and a wireless LAN system 5. The wireless LAN system 5 comprises access point apparatuses 101, 102, 103 and 104, and a wireless station 20.

The wireless LAN system 5 is a LAN (a wireless LAN) using a transmission line other than wire and cable. In the wireless LAN system 5, access control is performed by use of a permitted radio wave band. The access control may be performed based on, for example, the CSMA/CA (Carrier Sense Multiple Access/Collision Avoidance) system. Further, for the wireless LAN system 5, a group may be set to communicate with a specific access point apparatus, and a network identifier (SSID (Service Set Identification)) being identification data indicating the group may be set. Also, channels may be set for the wireless station 20 having the same SSID to be identified as another access point apparatus.

The server being a computer such as an ordinary file server, an Web server, an authentication server is connected to the communications line network 3, and communicates with the wireless station 20 being a client terminal via the access point apparatuses 101 to 104.

The access point apparatuses 101 to 104, transmitting a wave for performing wireless communication, serve to perform frame relay communication for the wireless station 20 to create a connection with the communications line network 3 and access the server 2.

Wireless LAN area 4 is a range where the wireless station 20 can detect radio waves generated by the access point apparatuses 101 to 104. For example, a radio wave generated by the access point apparatus 101 forms a different area from that of a radio wave generated by the access point apparatus 102, and interferences occur in an overlapping portion of the areas.

Figure 2:
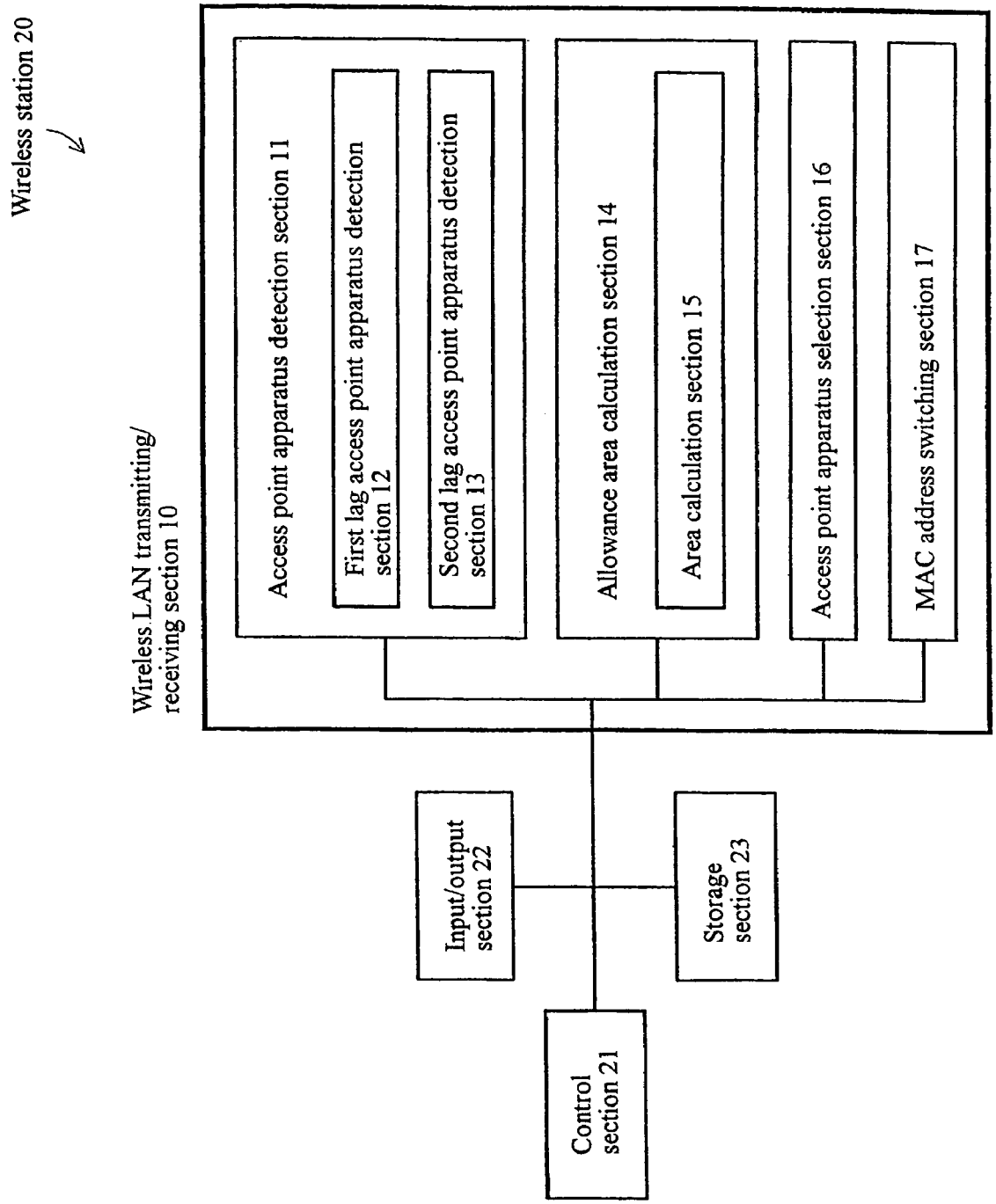
FIG. 2 illustrates a configuration of a wireless LAN station according to an embodiment of the present invention.

The wireless station 20 is a client terminal which creates a connection with the access point apparatuses 101 to 104 by use of radio wave and makes a connection with the server 2 via the communications line network 3. As shown in FIG. 2, the wireless station 20 comprises a control section 21, an input/output section 22, a storage section 23 and a wireless LAN transmitting/receiving section 10.

The control section 21, which is a central portion of the computer, such as a CPU (Central Processing Unit), performs arithmetic processing (calculation) and controls the flow of program and data. The input/output section 22 receives an input from the user and displays the arithmetic processing result etc. of the control section. The input devices of the input/output section include a keyboard, a mouse and a scanner, and the output devices include a display, a printer and a loudspeaker. The storage section 23, which is a storage of program and data, stores the processing result returned from the CPU. Specifically, the storage section 23 may be a memory serving as a center of the computer function.

The wireless LAN transmitting/receiving section 10 performs wireless communication for the wireless station. The wireless LAN transmitting/receiving section 10 receives radio waves generated by the access point apparatuses 101 to 104 and selects one access point apparatus. After creating a connection with the one access point apparatus, the wireless LAN transmitting/receiving section 10 communicates with the server 2 via the communications line network 3. When the wireless station 20 is a notebook computer or the like, the wireless LAN transmitting/receiving section 10 may be a wireless LAN card connectable to the PC card slot.

The wireless LAN transmitting/receiving section 10 comprises an access point apparatus detection section 11 which detects an access point apparatus within the wireless LAN area 4 of the wireless station 20, an allowance area calculation section 14 which calculates an allowance area according to received signal strength indicator and frequency of each access point apparatus, an access point apparatus selection section 16 which selects an access point apparatus, and a MAC address switching section 17 which switches MAC (Media Access Control) address for connection with an access point apparatus.

The access point apparatus detection section 11 receives radio waves generated by a plurality of the access point apparatuses 101 to 104, detects access point apparatuses, identifies the received signal strength indicator (RSSI), service set identifier (SSID), channel, etc. of each radio wave transmitted by a plurality of the access point apparatuses detected, and creates a list of the access point apparatuses based on the above radio wave characteristics. The access point apparatus detection section 11 may include a first rogue access point apparatus detection section 12 and a second rogue access point apparatus detection section 13.

The first rogue access point apparatus is an access point apparatus whose frequency bandwidth overlaps with that of an access point apparatus (a first access point apparatus) having a highest received signal strength indicator. The second rogue access point apparatus is an access point apparatus whose frequency bandwidth overlaps with that of an access point apparatus (a second access point apparatus) having a second highest received signal strength indicator.

When being provided with the first rogue access point apparatus detection section 12 and second rogue access point apparatus detection section 13, the access point apparatus detection section 11 confirms whether or not there is a first rogue access point apparatus or a second rogue access point apparatus from among a plurality of the access point apparatuses 101 to 104. If so, the access point apparatus detection section 11 determines based on received signal strength indicator (RSSI), SSID, channel, etc. of a radio wave transmitted by the access point apparatus, which access point apparatus is the first rogue access point apparatus or second rogue access point apparatus.

The allowance area calculation section 14 calculates an allowance area according to the received signal strength indicator (RSSI) and frequency of a radio wave of the access point apparatuses 101 to 104. In the allowance area calculation section 14, a plurality of radio waves from the access point apparatuses 101 to 104 received by the wireless station 20 are each represented as an area on a graph where received signal strength indicator is plotted along the ordinate and frequency along the abscissa, and an allowance area is calculated according to the area of one radio wave from among a plurality of the radio waves and the area of another radio wave whose frequency bandwidth overlaps with that of the one radio wave. At this time, the allowance area calculation section 14 calculates an allowance area by eliminating from the area of the one radio wave, an overlapping area between the area of the one radio wave and the area of the another radio wave. Specifically, the value of an allowance area is calculated according to the magnitude of an area obtained by eliminating from the area of the one radio wave, an overlapping area between the area of the one radio wave and the area of the another radio wave. Here, the one radio wave may be a radio wave having a highest received signal strength indicator. The allowance area calculation section 14 may include an area calculation section 15. In this case, the area calculation section 15 may calculate an allowance area according to the calculated area. For example, an area to be calculated may be a first area based on a radio wave of the first access point apparatus, or may be a third area based on a radio wave of the second access point apparatus, or may be a second area based on a radio wave of the first rogue access point apparatus, or may be a fourth area based on a radio wave of the second rogue access point apparatus.

The access point apparatus selection section 16 selects based on an allowance area calculated by the allowance area calculation section 14, one access point apparatus from among a plurality of the access point apparatuses 101 to 104. In selecting an access point apparatus, an access point apparatus having the same SSID (network identification ID) may be selected. When the access point apparatus selection section 16 selects one access point apparatus, the wireless LAN transmitting/receiving section 10 begins to communicate with the selected access point apparatus.

When the wireless station 20 specifies the MAC address of an access point apparatus to be communicated with in creating a connection with the access point apparatus selected by the access point apparatus selection section 16, the MAC address switching section 17 switches MAC address to select (switch) the access point apparatus.

Figure 3:
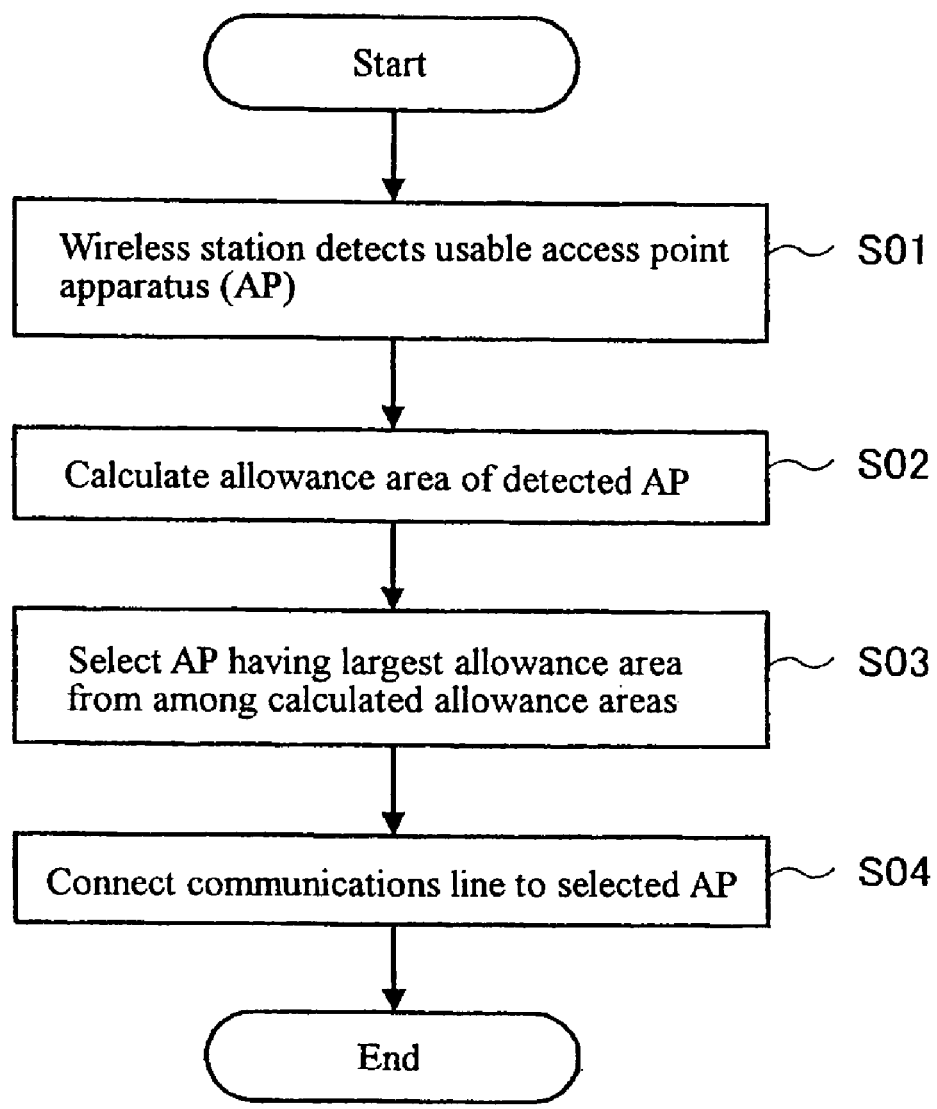
FIG. 3 depicts a flowchart of an operation of a wireless station according to an embodiment of the present invention.

The operation performed by the wireless station 20 will now be specifically described with reference to FIG. 3.

By use of the access point apparatus detection section 11, the wireless station 20 detects an usable access point apparatus from a wireless LAN area 4 having positioned therein the wireless station 20 (step S01). By use of the allowance area calculation section 14, the wireless station 20 calculates an allowance area of the access point apparatus detected (step S02). Here, the allowance area is calculated according to received signal strength indicator (RSSI) and frequency. By use of the access point apparatus selection section 16, the wireless station 20 selects as the access point apparatus to be connected with the wireless station 20, an access point apparatus having a largest allowance area according to the calculated allowance areas (step S03). Then, by use of the access point apparatus selection section 16, the wireless station 20 creates a connection with the selected access point apparatus (step S04).

The allowance area will now be described with reference to FIG. 4.

The radio waves generated by the access point apparatuses 101 to 104 each have a center frequency and a frequency bandwidth being a predetermined bandwidth relative to the center frequency. For example, according to IEEE802.11b being a standard of wireless LAN, a frequency of 2412 MHz is set as channel 1, and subsequent channels are set every 5 MHz. Accordingly, the frequency of channel 2 is 2417 MHz, and the frequency of channel 3 is 2422 MHz.

However, since the frequency bandwidth of a radio wave according to IEEE802.11b is approximately 20 MHz, channel 1 occupies a frequency area of 2412 MHz (center frequency)±10 MHz. The frequency of channel 2 is 2417 MHz; thus the frequency bandwidth of channel 2 overlaps with that of channel 1. Accordingly, radio wave interferences occur between channel 1 and channel 2.

Figure 4:
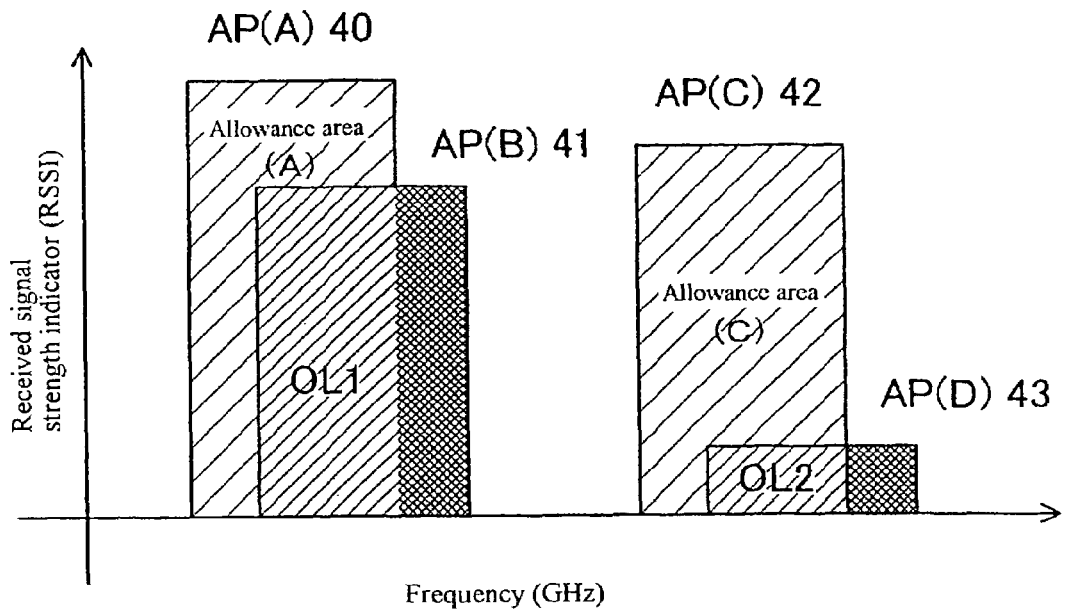
FIG. 4 illustrates a graph explaining an allowance area used in the present invention.

By way of example, the radio waves generated by the four access point apparatuses 101 to 104 and received by the wireless station 20 are shown in FIG. 4 where received signal strength indicator is plotted along the ordinate and frequency along the abscissa. As described above, radio wave has a predetermined frequency bandwidth relative to the center frequency, thus forming a rectangular area as shown in the drawing. The area AP(A) 40 is a range which a radio wave generated by the access point apparatus 101 forms based on received signal strength indicator and frequency; the area AP(B) 41 is a range which a radio wave generated by the access point apparatus 102 forms based on received signal strength indicator and frequency; the area AP(C) 42 is a range which a radio wave generated by the access point apparatus 103 forms based on received signal strength indicator and frequency; the area AP(D) 43 is a range which a radio wave generated by the access point apparatus 104 forms based on received signal strength indicator and frequency.

The rectangular areas overlap with each other between the access point apparatuses having a close center frequency (channel number). In the area AP(A) formed by the access point apparatus 101 and the area AP(B) formed by the access point apparatus 102, an overlapping area (OL1) based on AP(A) and AP(B) occurs. Further, in the area AP(C) formed by the access point apparatus 103 and the area AP(D) formed by the access point apparatus 104, also, an overlapping area (OL2) based on AP(C) and AP(D) occurs.

The allowance area calculation section 14 calculates an allowance area based on the magnitude of the areas AP(A) to AP(D) and the magnitude of OL1 and OL2.

[Equation 1]

$$AP(A)-OL1=\text{allowance area}(A) \quad \text{(formula 1)}$$

$$AP(C)-OL2=\text{allowance area}(C) \quad \text{(formula 2)}$$

Allowance area (A) being the allowance area of the access point apparatus 101 is calculated from formula 1. Specifically, the value of allowance area (A) is calculated by subtracting the magnitude of the overlapping area (OL1) between the area AP(A) formed by a radio wave of the access point apparatus 101 and the area formed by a radio wave of the access point apparatus 102 from the magnitude of the area AP(A).

Similarly to formula 1, allowance area (C) being the allowance area of the access point apparatus 102 is calculated from formula 2. Specifically, the value of allowance area (C) is calculated by subtracting the magnitude of the overlapping area (OL2) between the area AP(C) formed by a radio wave of the access point apparatus 102 and the area formed by a radio wave of the access point apparatus 103 from the magnitude of the area AP(C).

The access point apparatus selection section 16 compares the value of the calculated allowance area (A) and the value of the calculated allowance area (C) and selects the access point apparatus generating a radio wave having a larger allowance area.

Similarly, when there are four or more access point apparatuses in the wireless LAN system 1, also, the areas generated by each access point apparatus are calculated, the allowance area are calculated, and an access point apparatus generating a radio wave having a largest allowance area value is selected.

Figure 5:
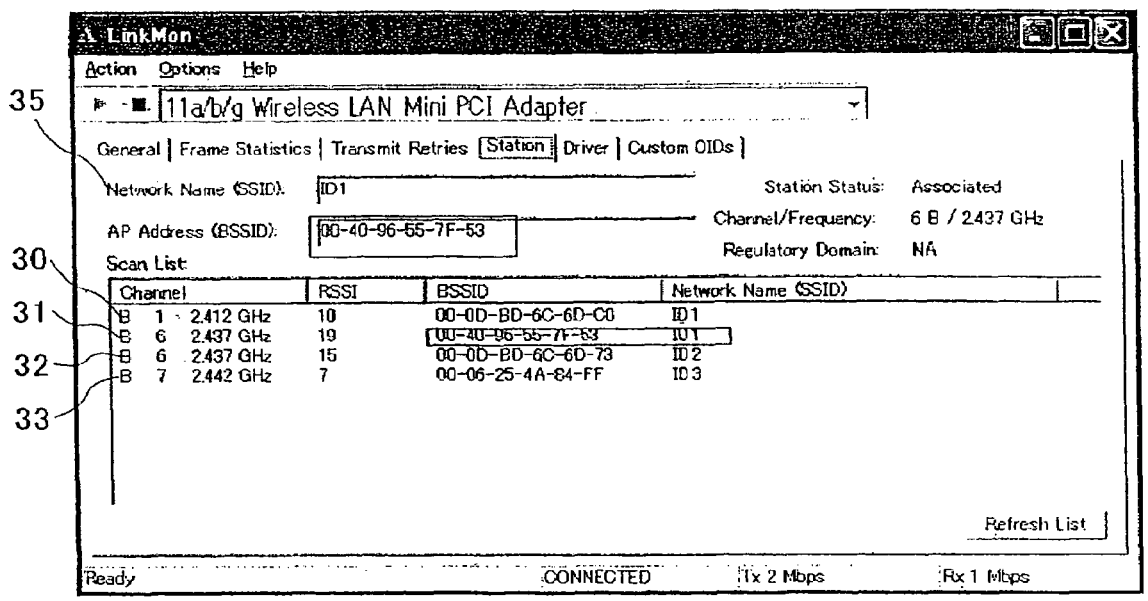
FIG. 5 depicts an exemplary screen image of the wireless station as used in the present invention.

The detection of an access point apparatus by the access point apparatus detection section 11 of the wireless station 20 will now be described with reference to FIG. 5. FIG. 5 shows a screen image displayed in an input/output section 22 of the wireless station 20.

The access point apparatus detection section 11 identifies and classifies radio waves 30, 31, 32 and 33 of the detected access point apparatuses based on SSID and BSSID (Basic Service Set Identifier) corresponding to MAC address of an access point apparatus and representing channel 1, center frequency, received signal strength indicator (RSSI) and network identifier, and thereby produces a list. In this example, BSSID is used for the classification. However, the classification may be performed based on ESSID (Extended Service Set Identifier).

After the access point apparatus detection section 11 of the wireless station 20 detects and classifies the radio waves of the access point apparatuses, an access point apparatus having a highest received signal strength indicator (RSSI) is connected, and the access point apparatus generating radio wave 31 having an RSSI of 19 is selected. Radio wave 32 having the same center frequency (channel number) as radio wave 31 is being received by the wireless station 20, so the wireless station 20 is in a state where radio wave interferences occur. In addition, the center frequency of radio wave 33 of channel 7 is separated only 5 MHz from the center frequency of radio waves 31 and 32 of channel 6, so the frequency bandwidths overlaps with each other. Thus, radio wave interferences also occur here. In this case, the areas of radio waves 30, 31, 32 and 33 are calculated, and the allowance areas are calculated.

[Equation 2]

[19(RSSI value of radio wave 31)−15(RSSI value of radio wave 32)]×20 MHz(frequency bandwidth) =80     (formula 3)

10(RSSI value of radio wave 30)×20 MHz(frequency bandwidth)=200     (formula 4)

The allowance area value of 80 is obtained by calculating a difference between the RSSI value of radio wave 31 and the RSSI value of radio wave 32 and multiplying the difference by the frequency bandwidth. However, this allowance area value is smaller than the allowance area value of 200 of radio wave 30 of channel 1 whose SSID is ID1. Consequently, the wireless station 20 selects the access point apparatus generating radio wave 30.

Here, SSID (=ID2) of radio wave 32 is different from SSID (=ID1) specified in item 35 to be connected with the wireless station 20. However, the area of radio wave 32 is calculated, and the resultant area is used to calculate an allowance area of radio wave 31.

When a connection is made to the access point apparatus generating radio wave 30, the access point apparatus may be connected by specifying MAC address by the MAC address switching section. In this case, MAC address may be indirectly switched by switching BSSID address.

Figure 6:
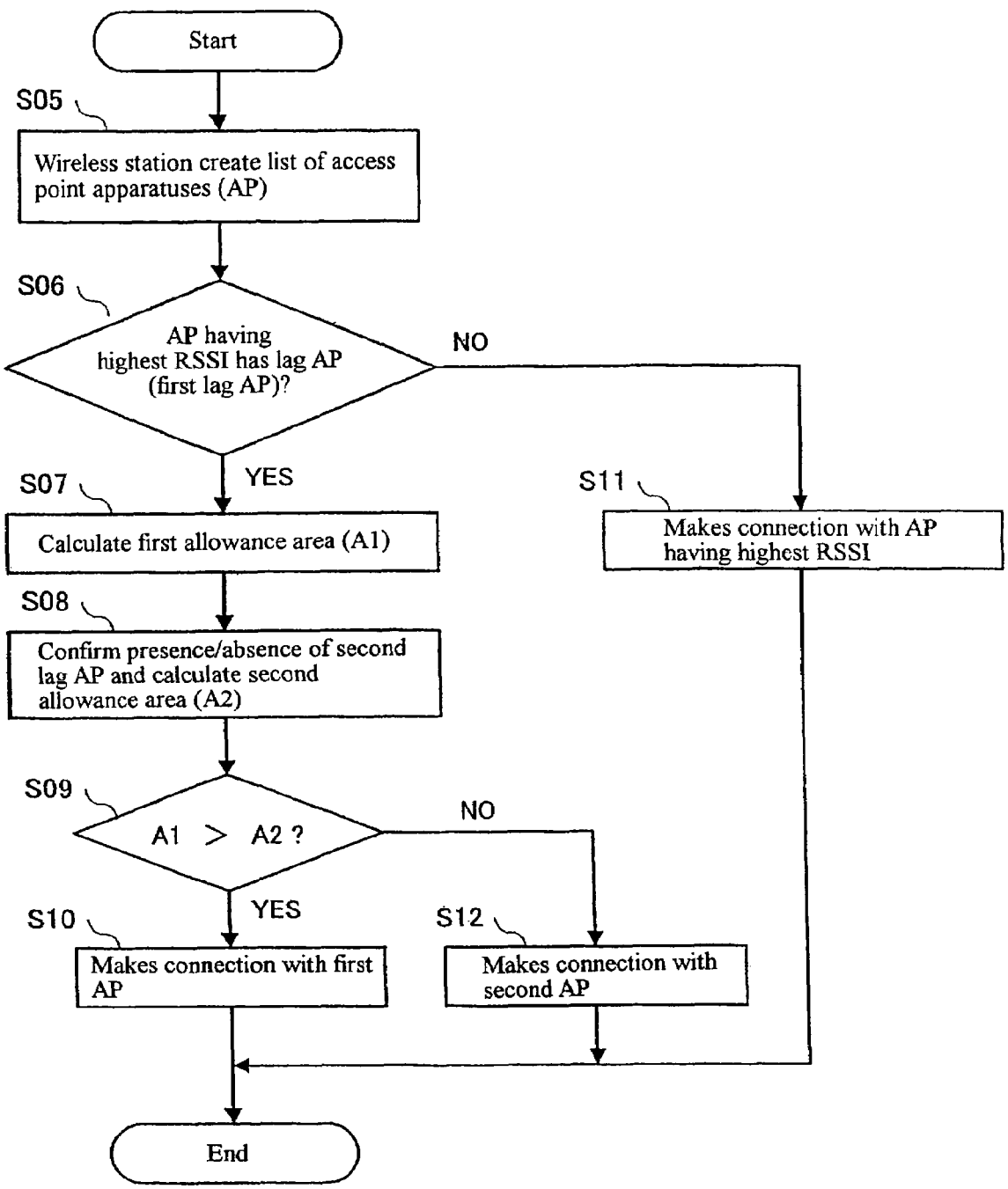
FIG. 6 is a flowchart of a method of selecting an optimum access point apparatus in accordance with the present invention.

Another embodiment of the present invention will now be described. FIG. 6 is a flowchart of a method of selecting an optimum access point apparatus without calculating an allowance area of all access point apparatuses detected by the wireless station 20.

First the access point apparatus detection section 11 of the wireless station 20 detects and classifies the access point apparatuses received, and thereby produces a list (step S05). From among these access point apparatuses, a first access point apparatus having a highest received signal strength indicator (RSSI), and a second access point apparatus having a second highest received signal strength indicator (RSSI) are detected. Further, the first rogue access point apparatus detection section 12 of the access point apparatus detection section 11 confirms whether or not there exists a first rogue access point apparatus having a frequency bandwidth which overlaps with that of the first access point apparatus (step S06).

The term "rogue access point apparatus" as used herein means an access point apparatus which generates a radio wave whose area overlaps with that of another wave, the radio wave being represented as an area on a graph where received signal strength indicator is plotted along the ordinate and frequency along the abscissa. Specifically, in the example of FIG. 4, the access point apparatus 102 forming the area AP(B) or the access point apparatus 104 forming the area AP(D) corresponds to this apparatus.

If it is determined that there exists no first rogue access point apparatus, the wireless station selects the first access point apparatus and creates a connection with it (step S11).

If it is determined that there exists a first rogue access point apparatus, the area calculation section 15 calculates a first allowance area (A1) according to a first area formed by a radio wave of the first access point apparatus and a second area formed by the first rogue access point apparatus (step S07).

Subsequently, the second rogue access point apparatus detection section 13 of the access point apparatus detection section 11 confirms whether or not there exists a second rogue access point apparatus having a frequency bandwidth which overlaps with that of the second access point apparatus. The area calculation section 15 calculates a third area formed by a radio wave of the second access point apparatus, and when there exists a second rogue access point apparatus, the area calculation section 15 calculates a fourth area formed by a radio wave of the second rogue access point apparatus.

The allowance area calculation section 14 calculates a second allowance area (A2) according to the third area and fourth area calculated (step S08).

Subsequently, the access point apparatus selection section 16 compares the magnitude of the allowance area 1 (A1) with the magnitude of the allowance area 2 (A2) (step S09). When the allowance area 1 (A1) is larger than the allowance area 2 (A2), this means that the allowance area of the first access point apparatus is larger than that of the second access point apparatus. Accordingly, the first access point apparatus is selected (step S10). When the allowance area 1 (A1) is smaller than the allowance area 2 (A2), this means that the allowance area of the second access point apparatus is larger than that of the first access point apparatus. Accordingly, the second access point apparatus is selected (step S12).

According to the embodiment as shown in FIG. 6, an optimum access point apparatus is selected from among the detected access point apparatuses without calculating an allowance area with respect to all the detected access point apparatuses.

When the wireless station 20 detects a rogue access point apparatus as described above, the detection of the rogue access point apparatus may be displayed in the input/output section 22 of the wireless station 20 to give an alarm to the user of the wireless station 20. The rogue access point apparatus detected may be a first rogue access point apparatus or a second rogue access point apparatus.

A system and method for implementing such embodiment can be realized by a program to be executed in a computer, a client and a server. Storage media for this program include an optical storage medium, a tape medium and a semiconductor memory. Alternatively, a storage apparatus, such as a hard disk and RAM, arranged in a server connected to a dedicated communications network or the Internet may be used as the storage medium to provide the program via network.

It should be understood that at least some aspects of the present invention may alternatively be implemented in a computer-useable storage medium that contains a program product. Programs defining functions on the present invention can be delivered to a data storage system or a computer system via a variety of storage media, which include, without limitation, non-writable storage media (e.g., CD-ROM), writable storage media (e.g., hard disk drive, read/write CD ROM, optical media), and system memory such as but not limited to Random Access Memory (RAM). It should be understood, therefore, that such storage media, when encoding computer readable instructions that direct method functions in the present invention, represent alternative embodiments of the present invention. Further, it should be understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A wireless station for use in a wireless LAN (Local Area Network) system, performing data communication with a server via a plurality of access point apparatuses, the wireless station comprising:
   an access point apparatus detection section which detects a usable access point apparatus from among the plurality of access point apparatuses;
   an allowance area calculation section which calculates an allowance area according to received signal strength indicator, frequency, and frequency bandwidth of a radio wave transmitted by an access point apparatus whose frequency bandwidth overlaps that of the usable access point apparatus, as well as according to received signal strength indicator, frequency, and frequency bandwidth of a radio wave transmitted by the usable access point apparatus; and
   an access point apparatus selection section which selects one from among the plurality of access point apparatuses based on the allowance area.

2. The wireless station according to claim 1, wherein the access point apparatus detection section detects a first access point apparatus having a highest received signal strength indicator and a second access point apparatus having a second highest received signal strength indicator from among the plurality of access point apparatuses.

3. The wireless station according to claim 2, comprising:
   a first rogue access point apparatus detection section which determines the presence/absence of a first rogue access point apparatus which is another usable access point apparatus and whose bandwidth overlaps with that of the first access point apparatus; and
   an area calculation section which calculates a first area according to received signal strength indicator, frequency, and frequency bandwidth of a radio wave transmitted by the first access point apparatus, and calculates a second area according to received signal strength indicator, frequency, and frequency bandwidth of a radio wave transmitted by the first rogue access point apparatus on condition that there exists the first rogue access point apparatus, wherein in the wireless station, the allowance area calculation section calculates a first allowance area according to the first area and the second area.

4. The wireless station according to claim 3, further comprising a second rogue access point apparatus detection section which, on condition that there exists the first rogue access point apparatus, determines the presence/absence of a second rogue access point apparatus which is another usable access point apparatus and whose bandwidth overlaps with that of the second access point apparatus, wherein:
   the area calculation section calculates a third area according to received signal strength indicator, frequency, and frequency bandwidth of a radio wave transmitted by the second access point apparatus, and calculates a fourth area according to received signal strength indicator, frequency, and frequency bandwidth of a radio wave transmitted by the second rogue access point apparatus; and
   the allowance area calculation section calculates a second allowance area according to the third area and the fourth area.

5. The wireless station according to claim 3, wherein in response to detection of the first rogue access point apparatus, the detection of the first rogue access point apparatus is displayed in the wireless station.

6. The wireless station according to claim 4, wherein in response to detection of the second rogue access point apparatus, the detection of the second rogue access point apparatus is displayed in the wireless station.

7. The wireless station according to claim 1, wherein the wireless station switches MAC (Media Access Control) address for connection to a MAC address of the selected access point apparatus.

8. The wireless station according to claim 1, wherein the access point apparatus selection section selects an access point apparatus having stored therein a predetermined network identifier from among the usable access point apparatuses.

9. The wireless station according to claim 1, wherein the allowance area calculation section calculates a plurality of radio waves received by the wireless station as an area on a graph where a vertical axis of the graph indicates received signal strength indicator and a horizontal axis of the graph indicates frequency, and calculates an allowance area according to an area of one radio wave from among the plurality of radio waves and an area of another radio wave whose frequency bandwidth overlaps with that of the one radio wave.

10. The wireless station according to claim 1, wherein the allowance area calculation section calculates an allowance area by subtracting an overlapping area between the area of the one radio wave and the area of the another radio wave from the area of the one radio wave.

11. In a wireless LAN (Local Area Network) system in which a wireless station and a server perform data communication with each other via a plurality of access point apparatuses, an access point apparatus selection method for selecting one from among the plurality of access point apparatuses, the method comprising:
   detecting, by the wireless station, a usable access point apparatus from among the plurality of access point apparatuses;
   calculating, by the wireless station, an allowance area according to received signal strength indicator, frequency, and frequency bandwidth of a radio wave transmitted by an access point apparatus whose frequency bandwidth overlaps that of the usable access point apparatus, as well as according to received signal strength indicator, frequency, and frequency bandwidth of a radio wave transmitted by the usable access point apparatus; and
   selecting, by the wireless station, one from among the plurality of access point apparatuses based on the allowance area.

12. The access point apparatus selection method according to claim 11, the method further comprising:

detecting, by the wireless station, a first access point apparatus having a highest received signal strength indicator and a second access point apparatus having a second highest received signal strength indicator from among the plurality of access point apparatuses.

13. The access point apparatus selection method according to claim 12, the method further comprising:

determining, by the wireless station, the presence/absence of a first rogue access point apparatus which is another usable access point apparatus and whose bandwidth overlaps with that of the first access point apparatus;

calculating, by the wireless station, a first area according to received signal strength indicator, frequency, and frequency bandwidth of a radio wave transmitted by the first access point apparatus;

calculating, by the wireless station, a second area according to received signal strength indicator, frequency, and frequency bandwidth of a radio wave transmitted by the first rogue access point apparatus on condition that there exists the first rogue access point apparatus; and calculating, by the wireless station, a first allowance area according to the first area and the second area.

14. The access point apparatus selection method according to claim 13, the method further comprising:

determining, by the wireless station, the presence/absence of a second rogue access point apparatus which is another usable access point apparatus and whose bandwidth overlaps with that of the second access point apparatus, when there exists the first rogue access point apparatus;

calculating, by the wireless station, a third area according to received signal strength indicator, frequency, and frequency bandwidth of a radio wave transmitted by the second access point apparatus, and a fourth area according to received signal strength indicator, frequency, and frequency bandwidth of a radio wave transmitted by the second rogue access point apparatus; and calculating, by the wireless station, a second allowance area according to the third area and the fourth area.

15. The access point apparatus selection method according to claim 13, the method further comprising:

displaying the detection of the first rogue access point apparatus in the wireless station on condition that the first rogue access point apparatus is detected.

16. The access point apparatus selection method according to claim 11, the method further comprising:

switching, by the wireless station, MAC (Media Access Control) address for connection to a MAC address of the selected access point apparatus.

17. The access point apparatus selection method according to claim 11, wherein in the step of selecting one from among the plurality of access point apparatuses, the wireless station selects an access point apparatus having stored therein a predetermined network identifier from among the usable access point apparatuses.

18. A computer-usable medium embodying computer program code, the computer program code comprising computer executable instructions configured for:

detecting, by a wireless station, a usable access point apparatus from among a plurality of access point apparatuses;

calculating, by the wireless station, an allowance area according to received signal strength indicator, frequency, and frequency bandwidth of a radio wave transmitted by an access point apparatus whose frequency bandwidth overlaps that of a usable access point apparatus, as well as according to received signal strength indicator, frequency, and frequency bandwidth of a radio wave transmitted by the usable access point apparatus; and selecting, by the wireless station, one from among the plurality of access point apparatuses based on the allowance area, wherein the computer-usable medium is a computer-usable storage medium.

19. The computer-usable medium of claim 18, wherein the embodied computer program code further comprises computer executable instructions configured for:

detecting, by the wireless station, a first access point apparatus having a highest received signal strength indicator and a second access point apparatus having a second highest received signal strength indicator from among the plurality of access point apparatuses.

20. The computer-usable medium of claim 19, wherein the embodied computer program code further comprises computer executable instructions configured for:

determining, by the wireless station, the presence/absence of a first rogue access point apparatus which is another usable access point apparatus and whose bandwidth overlaps with that of the first access point apparatus;

calculating, by the wireless station, a first area according to received signal strength indicator, frequency, and frequency bandwidth of a radio wave transmitted by the first access point apparatus;

calculating, by the wireless station, a second area according to received signal strength indicator, frequency, and frequency bandwidth of a radio wave transmitted by the first rogue access point apparatus on condition that there exists the first rogue access point apparatus; and calculating, by the wireless station, a first allowance area according to the first area and the second area.

* * * * *

UNITED STATES PATENT AND TRADEMARK OFFICE
CERTIFICATE OF CORRECTION

| | |
|---|---|
| PATENT NO. | : 7,664,084 B2 |
| APPLICATION NO. | : 11/301186 |
| DATED | : February 16, 2010 |
| INVENTOR(S) | : Asoh et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Thirtieth Day of November, 2010

David J. Kappos
*Director of the United States Patent and Trademark Office*